US007082111B2

(12) United States Patent
Amouris

(10) Patent No.: US 7,082,111 B2
(45) Date of Patent: Jul. 25, 2006

(54) METHOD FOR DYNAMICALLY ALLOCATING TIME SLOTS OF A COMMON TDMA BROADCAST CHANNEL TO A NETWORK OF TRANSCEIVER NODES

(76) Inventor: Konstantinos Amouris, 19-52 Country Club Rd., Eatontown, NJ (US) 07724

( * ) Notice: Subject to any disclaimer, the term of this patent is extended or adjusted under 35 U.S.C. 154(b) by 821 days.

(21) Appl. No.: 09/855,297

(22) Filed: May 15, 2001

(65) Prior Publication Data

US 2002/0001294 A1    Jan. 3, 2002

Related U.S. Application Data

(60) Provisional application No. 60/204,349, filed on May 15, 2000.

(51) Int. Cl.
*H04B 7/212* (2006.01)
*H04Q 7/20* (2006.01)

(52) U.S. Cl. .................. 370/321; 370/337; 370/347

(58) Field of Classification Search ............... 370/321, 370/337, 347, 442
See application file for complete search history.

(56) References Cited

U.S. PATENT DOCUMENTS

| | | | |
|---|---|---|---|
| 5,450,329 A | 9/1995 | Tanner | |
| 5,594,727 A | 1/1997 | Kolbenson et al. | |
| 5,648,955 A * | 7/1997 | Jensen et al. ............... | 370/252 |
| 5,719,868 A | 2/1998 | Young | |
| 5,949,760 A | 9/1999 | Stevens et al. | |
| 6,289,005 B1 * | 9/2001 | Katz ........................ | 370/328 |
| 6,788,702 B1 * | 9/2004 | Garcia-Luna-Aceves et al. .............. | 370/458 |

OTHER PUBLICATIONS

Elvino S. Sousa, Highly Sectorized System for Internet Wireless Access, Sep. 2000, Wireless Communications and Networking Conference, vol. 1, IEEE, p. 157.*

(Continued)

*Primary Examiner*—Chau Nguyen
*Assistant Examiner*—Cynthia L. Davis
(74) *Attorney, Agent, or Firm*—Carter DeLuca Farrell & Schmidt, LLP

(57) ABSTRACT

A method for allocating a set of time slots belonging to a common time division multiple access (TDMA) channel to a network of transceiver nodes is provided. The method includes the steps of dividing the set of time slots into a plurality of time slot sub-sets; defining for each transceiver node a common function that assigns one time slot sub-set of the plurality of time slot sub-sets to each point in space, where each point in space is identified by a unique set of space coordinates; and performing the following steps for each one of the transceiver nodes: periodically identifying a set of space coordinates; and allocating to each transceiver node time slots belonging to the time slot sub-set assigned by the common function to the point in space identified by the periodically identified set of space coordinates. The method further includes the step of resolving time slot allocation conflicts occurring when at least two transceiver nodes are allocated time slots belonging to an identical time slot sub-set and the distance between the at least two transceiver nodes is less than a predetermined distance threshold. This step includes allocating to each one of the at least two transceiver nodes time slots belonging to a different time slot sub-set of the identical time slot sub-set. The periodically identified set of space coordinates corresponds to the current set of space coordinates for each one of the transceiver nodes.

11 Claims, 6 Drawing Sheets

OTHER PUBLICATIONS

USAP Multiple Access: Dynamic Resource Allocation for Mobile Multihop Multichannel Wireless Networking, by C. David Young, Rockwell Collins, Inc.

TDMA Scheduling Design of Multihop Packet Radio Networks Based on Latin Squares, by Ji-Her Ju, Member, IEEE, and O. K. Li, Fellow, IEEE, IEEE Journal, vol. 17, No. 8, Aug. 1999.

An Optimal Topology-Transparent Scheduling Method in Multihop Packet Radio Networks, by Ji-Her Ju, Member, IEEE, and O. K. Li, Fellow, IEEE, IEEE Journal, vol. 6, No. 3, Jun. 1998.

Making Transmission Schedules Immune to Topology Changes in Multi-Hop Packet Radio Networks, by Imrich Chlamtac and András Faragó, University of Massachusetts, IEEE 1993, pp. 1854-1858.

A Distributed TDMA Rescheduling Procedure for Mobile Packet Radio Networks, by Mostafa H. Ammar and David S. Stevens, College of Computing, Georgia Institute of Technology, pp. 1609-1613.

Evaluation of a Distributed TDMA Rescheduling Procedure for Mobile Packet Radio Networks , by David S. Stevens and Mostafa H. Ammar, Georgia Institute of Technology, pp. 1167-1171.

Evaluation of Slot Allocation Strategies for TDMA Protocols in Packet Radio Networks, by David S. Stevens and Mostafa H. Ammar, College of Computing, Georgia Institute of Technology, pp. 0835-0839.

A Distributed Time-Slot Assignment Protocol for Mobile Multi-Hop Broadcast Packet Radio Networks, by Lawrence C. Pond and Victor O. K. Li, 1989 IEEE, pp. 0070-0074.

Distributed Scheduling of Broadcasts in a Radio Network , by Rajiv Ramaswami and Keshab K. Parhi, University of California, 1989 IEEE, pp. 497-504.

Distributed Algorithm for Efficient and Interference-Free Broadcasting in Radio Networks, by A. Ephremides and T. Truong, 1988 IEEE, pp. 1119-1124.

Distributed Assignment Algorithms for Multi-Hop Packet-Radio Networks, by Israel Cidon and Moshe Sidi, IBM, Yorktown Heights, NY, 1988 IEEE, pp. 1110-1118.

A Peer-to Peer Zone-Based Two-Level Link State Routing for Mobile AD HOC Networks, by Mario Joa-Ng and I-Tai Lu, 1999 IEEE Journal, vol. 17, No. 8, Aug. 1999.

International Search Report dated Nov. 19, 2001.

* cited by examiner

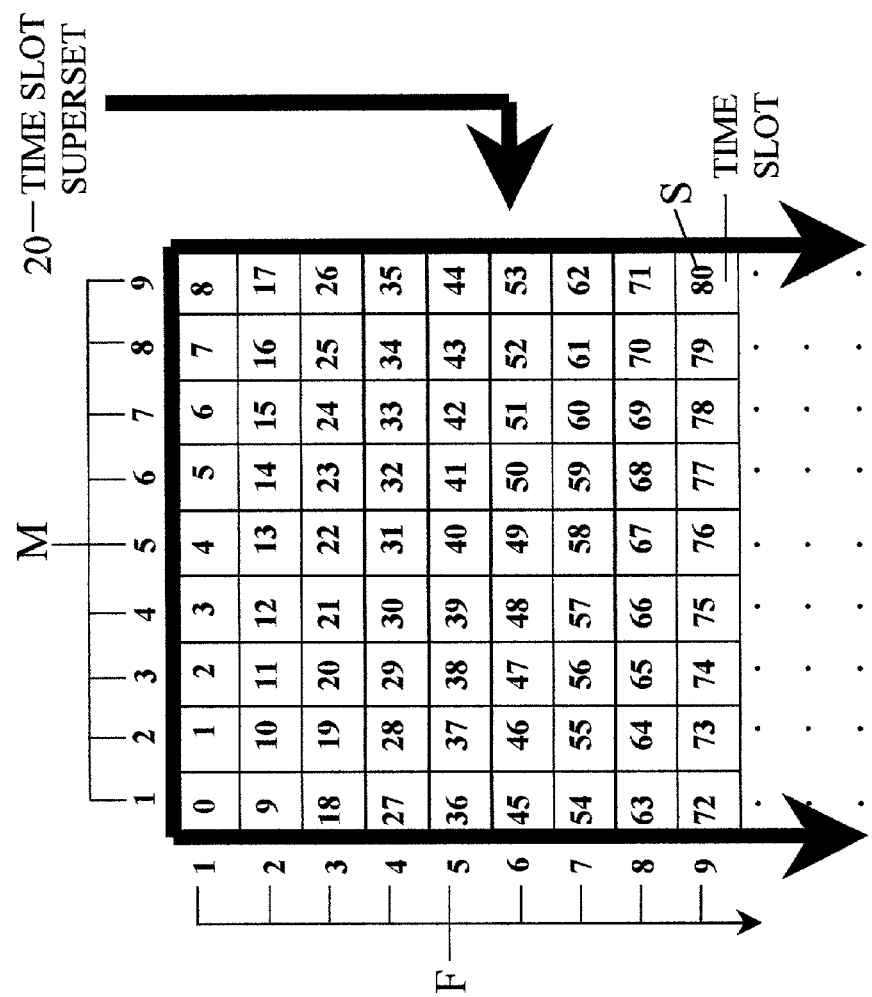
FIG. 2-A
PRIOR ART

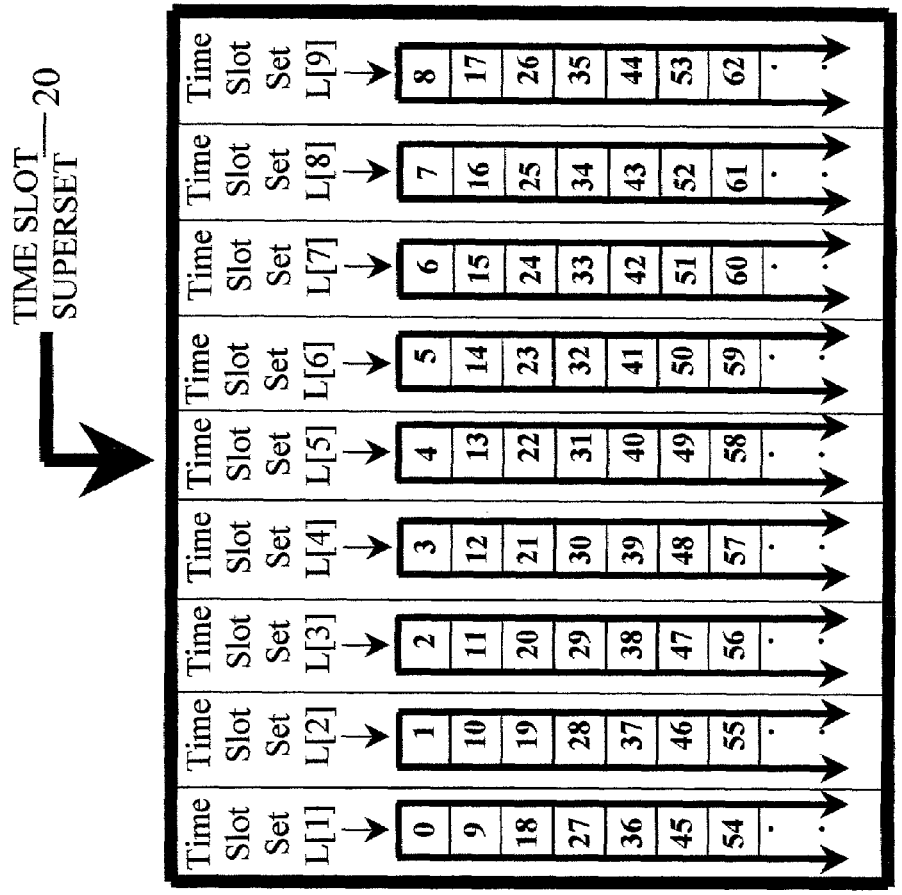
FIG. 2-B

METHOD FOR DYNAMICALLY ALLOCATING TIME SLOTS OF A COMMON TDMA BROADCAST CHANNEL TO A NETWORK OF TRANSCEIVER NODES

PRIORITY

This application claims priority to a United States Provisional Patent Application filed on May 15, 2000 having U.S. Provisional Application Ser. No. 60/204,349, the contents of which are incorporated herein by reference.

BACKGROUND OF THE INVENTION

1. Field of the Invention

The invention relates to the field of wireless communications, and specifically the invention relates to a method for dynamically allocating time slots of a common time division multiple access (TDMA) broadcast channel to a network of transceiver nodes.

2. Description of the Prior Art

A packet radio network consists of a number of geographically dispersed transceiver nodes that communicate with each other. Due to limited transmission power and the geographic distance that physically separates the nodes, the transmissions of a given node cannot be received by every other node in the network. Instead, the transmissions of a given node can be received only by the nodes located within the circular area covered by its transmission range R. Referring to FIG. 1, the transmissions of node n can be received only by the radios located within a circle 10 whose radius is equal to R, and its center is the location of node n. The circular area covered by the transmission range R of a node is referred to as the node's one-hop neighborhood. The circle 10 having node n as its center and R as its radius is the boundary of node n's one-hop neighborhood. Similarly, the circle 14 having node j as its center and R as its radius is the boundary of node j's one-hop neighborhood.

The circular area bounded by the circle 12 whose radius is equal to two times the transmission range (2R) and has node n as its center is defined as node n's two-hop neighborhood. Node n's two-hop neighborhood includes all the nodes that are included in the one-hop neighborhoods of all its one-hop neighbors. A node located within another node's one-hop neighborhood is referred to as a one-hop neighbor. Similarly, a node located within another node's two-hop neighborhood is referred to as a two-hop neighbor. The number of a node's one-hop neighbors is defined as the node degree. The maximum node degree of a network at a particular time instant is defined as the network degree. The maximum node degree of a network over all time is defined as the maximum network degree. In the rest of this specification, whenever a neighbor is not specified as 'one-hop' or 'two-hop' it will be understood that it is a one-hop neighbor.

The problem of dynamically allocating the time slots of a common TDMA broadcast channel to a geographically dispersed network of mobile transceiver nodes is especially challenging, this is because the time slot allocation in such an environment has to maximize the spatial re-use of time slots, while at the same time guaranteeing that each node's broadcast transmissions are successfully received by all its one-hop neighbors. In order to guarantee that a given node's broadcast transmissions during a given time slot are successfully received by all its one-hop neighbors, that node has to be the only transmitter within its two-hop neighborhood during that time slot.

With continued reference to FIG. 1, if nodes n and j transmit during the same time slot their transmissions will collide at node k, which is a one-hop neighbor of both nodes n and j. Therefore, in order to guarantee that node n's broadcast transmissions are successfully received by all its one-hop neighbors, node n has to be the only transmitter in its two-hop neighborhood, which is the area bounded by circle 12. The objective of an efficient TDMA time slot allocation method is to maximize the number of nodes that can transmit during the same time slot, while at the same time guaranteeing that their one-hop neighborhoods do not overlap. Furthermore, such a TDMA time slot allocation has to be resilient to changes in connectivity (topology) that are caused by the constant mobility of the network transceiver nodes.

Proposed TDMA time slot allocation methods can be divided into two categories: topology-dependent and topology-transparent. Topology-dependent time slot allocation methods rely on the instantaneous connectivity between the nodes within a two-hop neighborhood, and dynamically re-allocate time slots in a distributed manner in response to connectivity changes.

The main disadvantage of topology-dependent TDMA time slot allocation methods is that their efficiency and robustness is vulnerable in a highly mobile environment for the following reasons:

a) Significant overhead may be incurred in the process of coordinating time slot re-allocation within a two-hop neighborhood, due to the exchange of control packets that is required in order for all nodes involved in the re-allocation to have a consistent view of the updated time slot allocation;

b) Depending on the timing of events and the particular connectivity, the time slot re-assignment process within a two-hop neighborhood may trigger time slot re-assignments in adjacent, overlapping two-hop neighborhoods, causing a time slot re-allocation 'ripple' effect that could propagate throughout the entire network; this would increase the control overhead required to synchronize all the nodes even more;

c) Transmissions are lost during the transient period of time slot re-allocation; lost transmissions can seriously degrade network performance during transient periods since they cause retransmissions to occur, which in turn will be lost again if the time slot reallocation process has not converged, causing further retransmissions; in other words, if the transient period of the time slot re-allocation process is longer than some critical time threshold, the network performance may experience a spiral degradation;

d) The time slot re-allocation process may never converge if the rate of topology change exceeds the rate at which the protocol can re-compute and distribute the new schedules; this will cause catastrophic failure of the network.

In order to overcome the above deficiencies, a number of topology-transparent time slot allocation methods have been proposed. The basic idea of the proposed topology-transparent time slot allocation methods is for a node to transmit in a number of time slots in each time frame. The time slots which node n is allocated in a time frame correspond to a unique code such that for any given one-hop neighbor k of node n, node n is allocated at least one time slot which is not allocated to node k or any of k's one-hop neighbors. Therefore, within any given time frame, any neighbor of n can receive at least one packet from n collision-free.

The disadvantages of the topology-transparent TDMA time slot allocation methods are the following:

a) The transmitter is unable to know which neighboring nodes can correctly receive the packet it sends in a particular slot, because these methods cannot guarantee a unique transmitter within a two-hop neighborhood; therefore, these time slot allocation methods cannot be used in conjunction with interactive query/response schemes between a particular transmitter and a particular receiver. In addition, since the transmitter does not know which neighbor can receive its transmissions at what time slot, it has to repeat transmitting the same packet during every allocated time slot within a frame in order to guarantee that the intended destination correctly receives the packet.
b) The number of time slots between successive transmissions of different packets by a given node produced by these methods is proportional to the square of the maximum network degree; therefore, the bandwidth efficiency of these methods drops exponentially as the maximum network degree increases.
c) They require a priori knowledge of the network size and the maximum network degree; therefore, these methods cannot be used in scenarios where the network size and the maximum network degree vary in an unpredictable manner.

A need therefore exists for a distributed, dynamic TDMA time slot allocation method that overcomes the limitations of the prior art TDMA time slot allocation methods in mobile, geographically dispersed, broadcast packet radio networks.

SUMMARY OF THE INVENTION

In accordance with the present invention, a method is provided for allocating a set of time slots belonging to a common time division multiple access (TDMA) channel to a network of transceiver nodes. The method includes the steps of dividing the set of time slots into a plurality of time slot sub-sets; defining for each transceiver node a common function that assigns one time slot sub-set of the plurality of time slot sub-sets to each point in space, where each point in space is identified by a unique set of space coordinates; and performing the following steps for each one of the transceiver nodes: periodically identifying a set of space coordinates; and allocating to each transceiver node time slots belonging to the time slot sub-set assigned by the common function to the point in space identified by the periodically identified set of space coordinates.

The method further includes the step of resolving time slot allocation conflicts occurring when at least two transceiver nodes are allocated time slots belonging to an identical time slot sub-set and the distance between the at least two transceiver nodes is less than a predetermined distance threshold. This step includes allocating to each one of the at least two transceiver nodes time slots belonging to a different time slot sub-set of the identical time slot sub-set. The periodically identified set of space coordinates corresponds to the current set of space coordinates for each one of the transceiver nodes.

Accordingly, several objects and advantages of the present invention are:
a) The TDMA time slot allocation produced by the present invention is independent of the instantaneous connectivity between the nodes of the network; therefore, the present method does not suffer from the deficiencies associated with prior art topology-dependent time slot allocation methods.
b) The TDMA time slot allocation produced by the present invention guarantees a unique transmitter within a two-hop neighborhood, therefore making it possible for a particular sender and a particular receiver to engage in an interactive dialogue; therefore, the present invention can be readily used to facilitate the collision-free transmission of control packets that are responsible for the allocation of channel resources within a two-hop neighborhood. Furthermore, since there is only one transmitter in any given two-hop neighborhood, a node does not need to transmit a packet more than once in order to guarantee that every neighbor received it (the packet) correctly.
c) The number of time slots elapsing between successive transmissions of different packets by a given node produced by the present invention is linear with respect to the maximum network degree, instead of quadratic; therefore, the present invention exponentially outperforms the prior art topology-transparent time slot allocation methods. This means that for the same channel bandwidth, the present invention can accommodate networks with quadratically higher densities. Conversely, for the same network density, the present invention can provide quadratically higher bandwidth utilization.
d) It does not require a priori knowledge of the network size, or the maximum network degree, therefore making it automatically adaptable to variable network sizes and densities.

BRIEF DESCRIPTION OF DRAWINGS

FIG. 2-A is an illustration of the first 80 time slots of a superset of time slots belonging to a conventional TDMA channel;

FIG. 2-B graphically illustrates the division of the time slot superset shown in FIG. 2-A into 9 time slot sets according to the principles of the present invention;

DETAILED DESCRIPTION OF THE INVENTION

Figure 1:
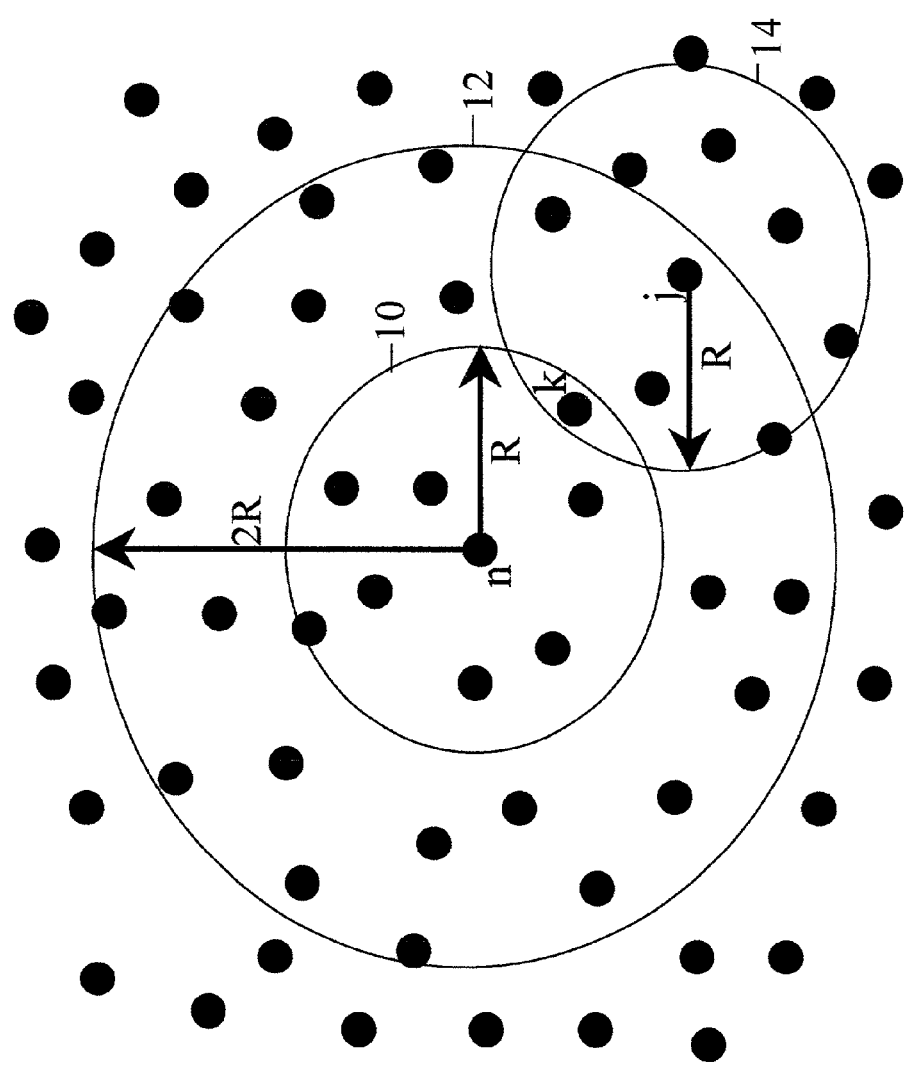
FIG. 1 is a diagram of a network of nodes according to the prior art.

FIG. 2-A shows the first 80 time slots of a time slot superset 20 belonging to a common Time Division Multiple Access (TDMA) channel. A time slot is uniquely identified by its sequence number S. Alternatively, a time slot can be uniquely identified by the pair (M, F), where M is the time slot's circular sequence number (column number in FIG. 2-A), and F is the time slot's frame sequence number (row number in FIG. 2-A). A time frame is defined as a group of 9 consecutive time slots. In FIG. 2-A, each row of time slots is a different time frame.

The sequence number S and the circular sequence number M of a particular time slot are related by the following equation:

$$M = \mathrm{Modulo}[S/9] + 1 \qquad (1)$$

M is a time slot sequence number that resets to 1 every 9 consecutive time slots. The maximum value of M is equal to the length (in slots) of the time frame. F is incremented every time M is reset to 1, which signifies the beginning of a new time frame. The sequence number S and the frame sequence number F of a particular time slot are related by the following equation:

$$F = \text{Floor}[S/9] + 1 \qquad (2)$$

Since M resets every 9 consecutive time slots, no two time slots within a time frame can have the same value of M.

Dividing Time Slot Superset into Multiple Time Slot Sets

Referring to FIG. 2-B, according to the method of the present invention, we then divide the time slot superset 20 into the following 9 time slot sets:

| | | |
|---|---|---|
| L[1] = {S\|M = 1} = {0,9,18,27,36,45,54,63,72, ... , 9n + 0, ... } | where n = 0,1,2,3, ... , ∞ |
| L[2] = {S\|M = 2} = {1,10,19,28,37,46,55,64,73, ... , 9n + 1, ... } | where n = 0,1,2,3, ... , ∞ |
| L[3] = {S\|M = 3} = {2,11,20,29,38,47,56,65,74, ... , 9n + 2, ... } | where n = 0,1,2,3, ... , ∞ |
| L[4] = {S\|M = 4} = {3,12,21,30,39,48,57,66,75, ... , 9n + 3, ... } | where n = 0,1,2,3, ... , ∞ |
| L[5] = {S\|M = 5} = {4,13,22,31,40,49,58,67,76, ... , 9n + 4, ... } | where n = 0,1,2,3, ... , ∞ |
| L[6] = {S\|M = 6} = {5,14,23,32,41,50,59,68,77, ... , 9n + 5, ... } | where n = 0,1,2,3, ... , ∞ |
| L[7] = {S\|M = 7} = {6,15,24,33,42,51,60,69,78, ... , 9n + 6, ... } | where n = 0,1,2,3, ... , ∞ |
| L[8] = {S\|M = 8} = {7,16,25,34,43,52,61,70,79, ... , 9n + 7, ... } | where n = 0,1,2,3, ... , ∞ |
| L[9] = {S\|M = 9} = {8,17,26,35,44,53,62,71,80, ... , 9n + 8, ... } | where n = 0,1,2,3, ... , ∞ |

The time slots of a particular time slot set have the same value of M. In essence, time slot set L[k] consists of the $k^{th}$ time slot of each (infinitely many) time frame.

Figure 3:
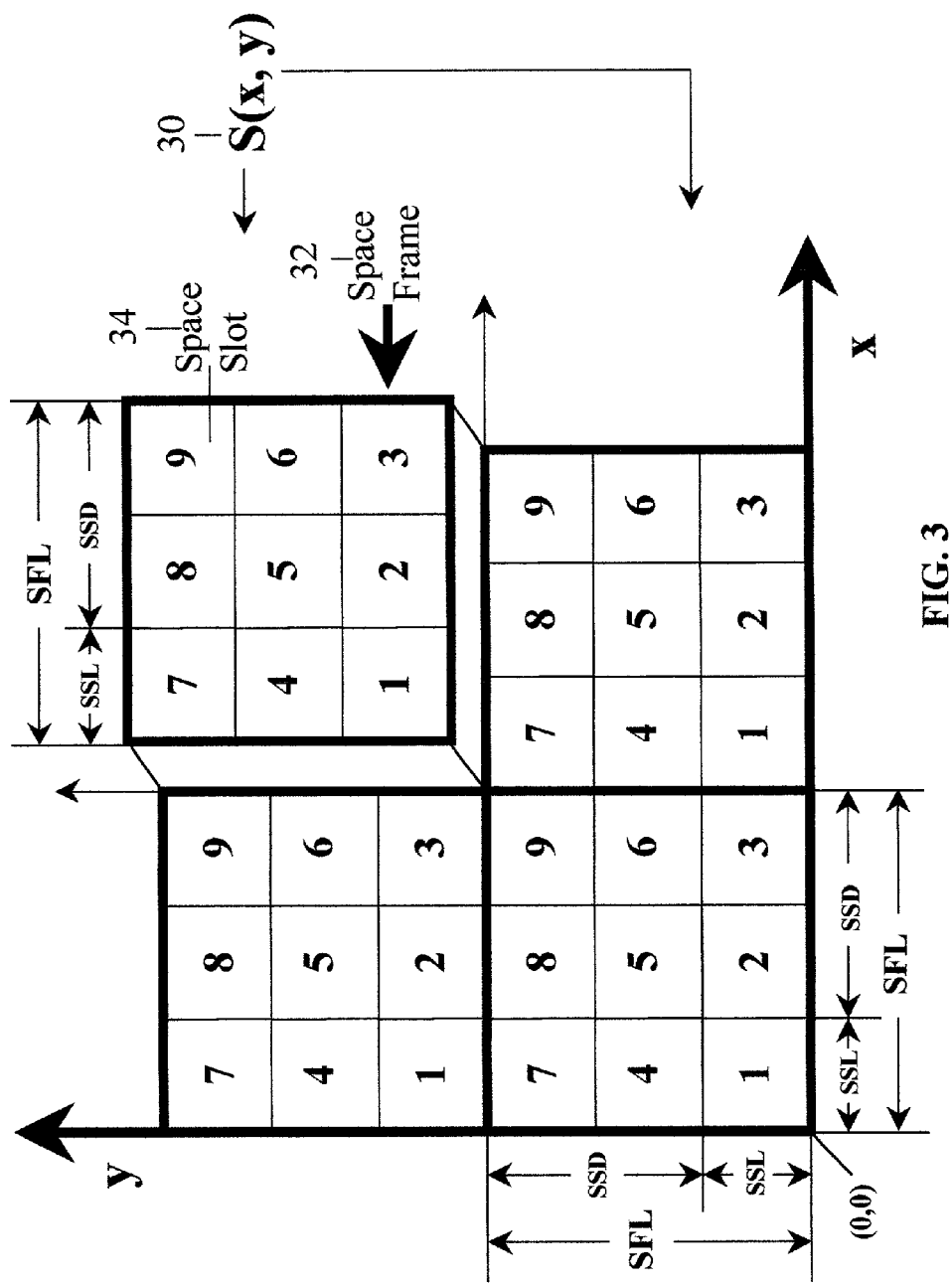
FIG. 3 graphically illustrates a two-dimensional function that assigns one integer to each point in two-dimensional (x, y) space according to the principles of the present invention.

Defining a Common Function that Assigns One Time Slot Set to Each Point in Space Referring to FIG. 3, according to the method of the present invention, we define for each node a two-dimensional function S(x, y) 30 that assigns an integer to each point (x, y) in two-dimensional space. The integer assigned to each point (x, y) represents one of the time slot sets L listed in the discussion of FIG. 2-B above. Therefore, for any given point $(x_i, y_j)$, function S(x, y) 30 assigns time slot set $L[S(x_i, y_i)]$ to space point $(x_i, y_i)$. In essence, function S(x, y) assigns the $k^{th}$ time slot of each (infinitely many) time frame to points whose coordinates $(x_i, y_i)$ satisfy the equation $\{S(x_i, y_i) = k\}$.

The function S(x, y) 30 is defined by the following equation:

$$S(x,y) = [V(y) - 1] * 3 + H(x) \qquad (3)$$

The functions H(x) and V(y) are defined by the following equations:

$$H(x) = \text{ceiling}[\text{modulo}(x/SFL)/SSL] \qquad (4)$$

$$V(y) = \text{ceiling}[\text{modulo}(y/SFL)/SSL] \qquad (5)$$

SFL and SSL are defined in what follows. Due to the inherent periodicity of the modulo operation, H(x) and V(y) are periodic with respect to x and y respectively, and the following equations are true:

$$H(x) = H(x + SFL) \qquad (6)$$

$$V(y) = V(y + SFL) \qquad (7)$$

Consequently, S(x, y) 30 is periodic in x and y, and the following set of equations is true:

$$S(x, y) = S(x + SFL, y) = S(x + SFL, y + SFL) = S(x, y + SFL) \qquad (8)$$

It follows that:

$$L[S(x, y)] = L[S(x + SFL, y)] = L[S(x + SFL, y + SFL)] = L[S(x, y + SFL)] \qquad (9)$$

Equations 8 and 9 say that points that are assigned the same integer by function S(x, y) 30 are assigned the same time slot sets. Points that are assigned the same integer by S(x, y) 30 are referred to as 'simultaneous'. Since simultaneous points are assigned the same time slot set, nodes located at simultaneous points are eligible to schedule transmissions during the same time slots. Therefore, the periodicity of function S(x, y) 30 automatically facilitates spatial re-use of time slots. The parameter SFL is defined as the distance between simultaneous points.

Since there are only 9 time slot sets to be assigned to an infinite number of points in two-dimensional space, S(x, y) 30 cannot assign a different time slot set to each distinct point in space. Instead, S(x, y) 30 assigns a different time slot set to each space slot 34; a space slot 34 is defined as a set of contiguous space points forming a square such that for any two points $(x_1, y_1)$ and $(x_2, y_2)$ belonging to the set, both of the following equations are true:

$$\text{Floor}(x_1/SSL) = \text{Floor}(x_2/SSL) \qquad (10)$$

$$\text{Floor}(y_1/SSL) = \text{Floor}(y_2/SSL) \qquad (11)$$

The parameter SSL represents the space slot 34 length. Due to the ceiling operation, points that belong to the same space slot 34 are assigned the same time slot set by function S(x, y) 30. Furthermore, due to the periodicity of S(x, y) 30, space slots 34 whose centers are separated by a distance equal to SFL are assigned the same time slot set. Space slots that are assigned the same time slot set are referred to as 'simultaneous'.

A space frame 32 is defined as a block of contiguous space slots 34 such that a) no two space slots 34 in the block are simultaneous, and b) the union of the time slot sets assigned to each space slot 34 in the space frame 32 is equal to the time slot superset 20 being allocated. Given the definition of the space frame 32, we can say that S(x, y) 30 consists of the superposition of infinite space frames 32 in both the x and y directions.

We define SSD as the minimum distance between two simultaneous space slots 34. The following equations hold:

$$SFL = SSL + SSD \qquad (12)$$

$$SFL = 3 * SSL \qquad (13)$$

By combining the above equations we obtain:

$$SSL + SSD = 3 * SSL \rightarrow SSD = 3 * SSL - SSL \rightarrow SSD = 2 * SSL \rightarrow SSL = SSD/2 \qquad (14)$$

$$SFL = 3 * SSD/2 \qquad (15)$$

In order to prevent transmissions from nodes located in simultaneous space slots 34 from colliding at common neighbors, the minimum distance (SSD) between simultaneous space slots 34 has to be equal to two times the transmission range (R). This ensures that transmitting nodes located in simultaneous space slots will never have any one-hop neighbors in common since their one-hop neighborhoods do not overlap. Therefore, SSD is set to 2R, guaranteeing that transmitters located at simultaneous points will not have any common one-hop neighbors. Therefore, equations 14 and 15 can be rewritten as:

$$SSL = 2R/2 \rightarrow SSL = R \quad (16)$$

$$SFL = 3*2R/2 \rightarrow SFL = 3R \quad (17)$$

Consequently, equations 4, and 5 can be written as:

$$H(x) = \text{ceiling}[\text{modulo}(x/3R)/R] \quad (18)$$

$$V(y) = \text{ceiling}[\text{modulo}(y/3R)/R] \quad (19)$$

Node Dynamic Time Slot Allocation Process

Figure 4:
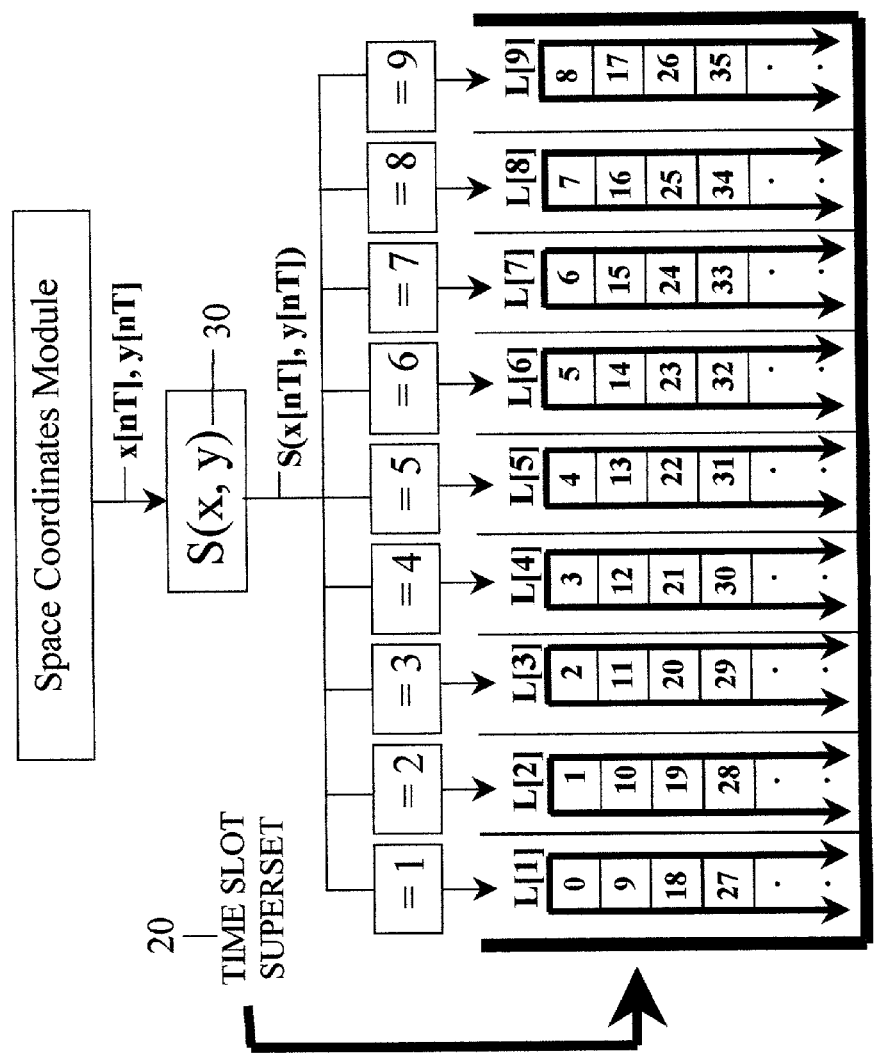
FIG. 4 schematically illustrates the dynamic time slot allocation process that occurs in each node of the network according to the principles of the present invention.

Referring to FIG. 4, each node in the network is equipped with a space coordinates module that periodically provides it (the node) access to its current space coordinates $x[nT]$ and $y[nT]$. The parameter T represents the period with which the space coordinates module outputs the node's current space coordinates, and n is a running counter. Then, according to the present method, each node in the network executes the following steps:

a) numerically evaluates function S(x, y) 30 by substituting $x[nT]$ for x, and $y[nT]$ for y;

b) allocates itself the time slots belonging to time slot set $L[S(x[nT], y[nT])]$, which is the time slot set assigned to its current space coordinates $x[nT]$ and $y[nT]$ by function S(x, y) 30.

A node is eligible to schedule transmissions during the time slots that are allocated to it.

Time Slot Allocation Conflict Resolution

A time slot allocation conflict occurs when multiple nodes are collocated within the same space slot 34 (see FIG. 3) because:

a) All collocated nodes are eligible to schedule transmissions during the time slots of the same time slot set, and b) Since the space slot 34 length (SSL) is equal to the transmission range R, the distance between any two collocated nodes is less than 2R; consequently, the one-hop neighborhoods of any given two collocated nodes will overlap, resulting in the existence of common neighbors; therefore, simultaneous transmissions from collocated nodes will collide at these common neighbors, resulting in lost transmissions.

A need therefore arises for the inventive method described herein to resolve such time slot allocation conflicts. Let C represent the number of nodes that are collocated within a particular space slot at a given time $t_c$, and let L[3] be the time slot set that is assigned to that particular space slot by function S(x, y) 30. Then, all collocated nodes allocate themselves time slot set L[3], which is described by the following equation:

$$L[3] = \{S|M=3\} = \{2, 11, 20, 29, 38, 47, 56, 65, 74, \ldots, 9n+2, \ldots\} n=0, 1, 2, 3, \ldots, \infty \quad (20)$$

According to the present invention, time slot allocation conflicts are resolved as follows:

A) Each collocated node n continuously maintains:

A1) an ascending-order sorted list of the node identifiers of all collocated nodes, including its own; and A2) the integer variable CRI[n] (Conflict Resolution Index[n]), which represents the relative order of its own identifier within the collocated node identifier sorted list; CRI ranges from 1 to C.

B) Defines and assigns itself the time slot subset described by the following equation:

$$Q[n] = \{S|[M=3]\text{AND}[\text{modulo}[(F-1)/C] = CRI[n]-1]\} \quad (21)$$

So, for example, let's say that nodes 2, 17, and 5, are collocated within the same space slot and are assigned time slot set L[3]. Then, each collocated node produces and maintains the following sorted node identifier list: LIST={2, 5, 17}. In this example, C is equal to 3.

In addition, the CRIs of nodes 2, 5, and 17 are given by:

$$CRI[\text{node } 2] = 1 \quad (22)$$

$$CRI[\text{node } 5] = 2 \quad (23)$$

$$CRI[\text{node } 17] = 3 \quad (24)$$

Consequently, node 2 defines and assigns itself time slot subset Q[2], node 5 defines and assigns itself time slot subset Q[5], and node 17 defines and assigns itself time slot subset Q[17], where Q[2], Q[5], and Q[17] are described by equations 25, 26, and 27, respectively:

$$Q[2] = \{S|[M=3]\text{AND }[\text{modulo}[(F-1)/3]=0]\} = \{2, 29, 56, 83, 110, \ldots\} \quad (25)$$

$$Q[5] = \{S|[M=3] \text{ AND }[\text{modulo}[(F-1)/3]=1]\} = \{11, 38, 65, 92, 119, \ldots\} \quad (26)$$

$$Q[17] = \{S|[M=3] \text{ AND }[\text{modulo}[(F-1)/3]=2]\} = \{20, 47, 74, 101, 128, \ldots\} \quad (27)$$

Derivation of Maximum Time Between Successive Transmissions by a Given Node

Define X as the number of time slots elapsed between successive transmissions by a given node. Since the difference of the sequence numbers of two consecutive time slots belonging to the same time slot set is equal to 9, the minimum value of X is equal to 9; this minimum value is achieved when the given node is the only node located in its space slot. When there are C nodes collocated within a space slot, the difference of the sequence numbers of two consecutive time slots belonging to the same time slot subset is equal to 9C; therefore, X is given by the following equation:

$$X = 9*C \quad (28)$$

The area of a space slot SSA is given by:

$$SSA = SSL^2 = R^2 \quad (29)$$

The area of a node's one-hop neighborhood (see FIG. 1) is given by:

$$\text{One-hop Neighborhood Area} = \pi*R^2 \approx 3.14*R^2 \quad (30)$$

Since the area of a space slot is less than one third of the area of a node's one-hop neighborhood, the number of nodes that can be collocated within the same space slot at any given time can never be greater than the maximum number of one-hop neighbors that a node can ever have, which is by definition equal to the maximum network degree $D_{max}$.

Therefore, the maximum value of X can be written as:

$$X_{max} = 9*C_{max} = 9D_{max} \quad (31)$$

Therefore, according to the time slot allocation produced by the present invention, the maximum number of time slots that will elapse between two successive transmissions by a given node is linearly proportional to the maximum network degree; this is exponential improvement over prior art topology-transparent time slot allocation methods, according to which the maximum number of time slots between two successive transmissions of different packets by a given node is proportional to the square of the maximum network degree.

Figure 5:
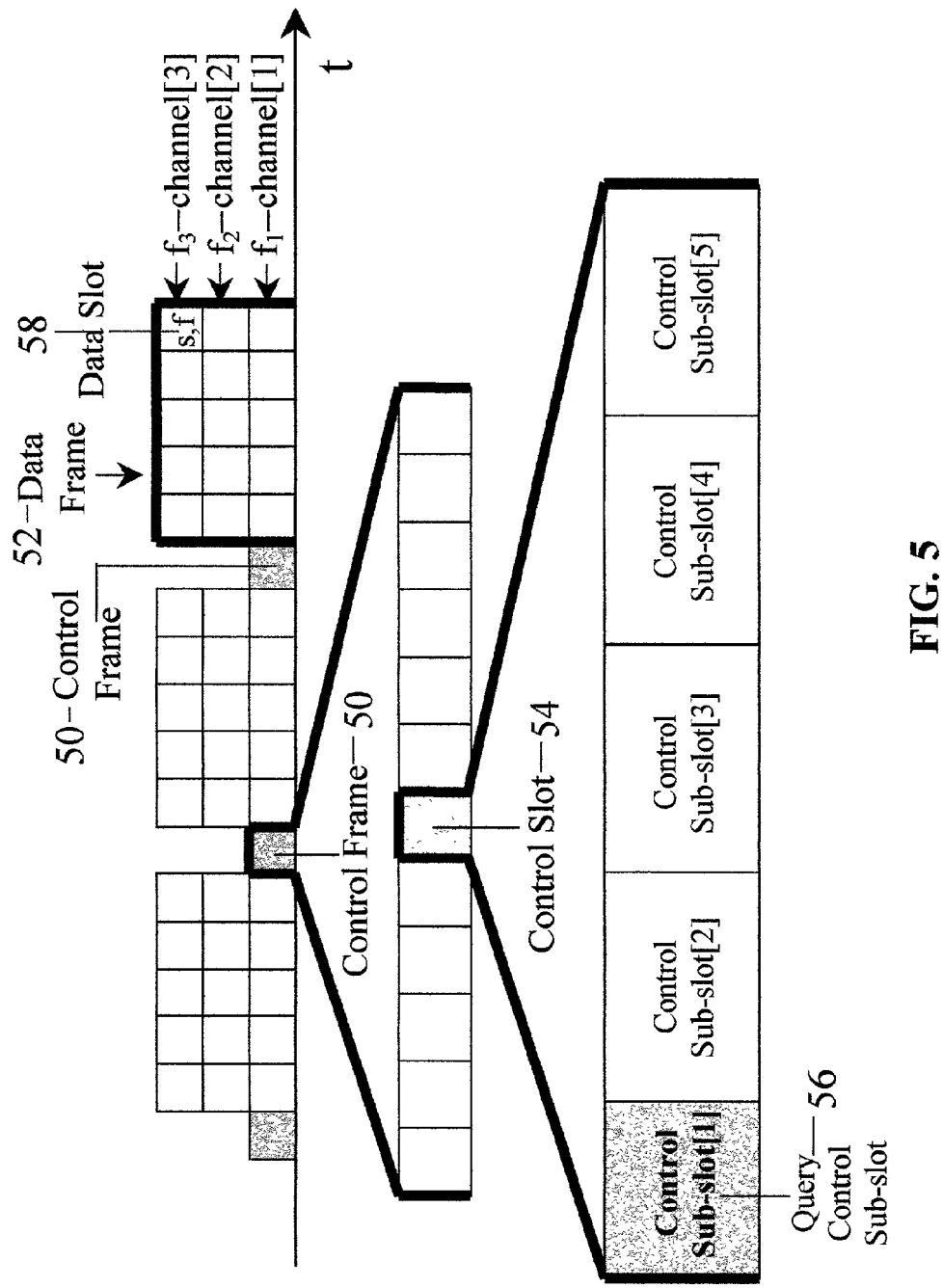
FIG. 5 is a diagram of a reservation time division multiple access structure utilizing the principles of the present invention.

Using Allocated Superset of Time Slots for Managing Communication Channel Resources Referring to FIG. 5, time is divided into multiple super-frames. Each super-frame consists of a control frame 50 and a data frame 52. The control frame 50 is used for the transmission of control packets that coordinate the conflict-free allocation of data communication slots within a two-hop neighborhood, and the data frame 52 is used for the transmission of data packets.

The data frame 52 is a two-dimensional array of discrete bandwidth blocks 58, each bandwidth block 58 being uniquely specified by its time slot ID s and the channel f it belongs to. In the rest of this specification, the notation (s, f) is used to represent a bandwidth block; s represents a particular time slot, and f represents a particular channel (out of the three channels $f_1$, $f_2$, $f_3$ shown).

The function of the control frame 50 is to coordinate the conflict free allocation of each (s, f) pair, subject to the following constraints:

a) A node cannot transmit and receive during the same time slot.
b) A node cannot transmit on a (s, f) pair that is used by any one of its neighbors to receive.
c) A node cannot receive on a (s, f) pair that is used by any one of its neighbors to transmit.

If nodes have the ability to vary the power used for their transmissions, constraints b and c can be rewritten as follows:

b) The transmission power used by a node for transmitting on a (s, f) pair has to be such that the transmitting node will not interfere with any of its neighbors that are receiving on (s, f).
c) A node cannot receive on a (s, f) pair on which a neighbor is transmitting at a power level that will interfere with the node's ability to receive.

Each control frame 50 is divided into multiple control slots 54 that are used to facilitate a dialogue between a sender, who sends queries, and a set of intended receivers, who send responses; thus, each control slot 54 is further divided into multiple control sub-slots. The first control sub-slot 56 in each control slot 54 is designated as the query control sub-slot. Query control sub-slots are used by senders to send query control packets to a list of intended receivers within its one-hop neighborhood. The even-numbered control sub-slots are used by the intended receivers to send response control packets, responding to the queries sent by the sender; the odd-numbered control sub-slots are used by the sender to send confirmation control packets, confirming receipt of the data in the response control packets.

Allocating the Superset of Control Time Slots

The superset of control time slots consisting of all control time slots 54 is allocated as follows:

a) The control time slot superset is divided into 16 control time slot sets ($L_c[1]$, $L_c[2]$, $L_c[3]$, ..., $L_c[16]$). The circular sequence number $M_c$ associated with the control time slots of control time slot set $L_c[k]$ is equal to k, where k ranges from 1 to 16.

b) The function $S_c(x, y)$ used for the allocation of the control time slot superset is given by the following equation:

$$S_c(x, y) = [V_c(y)-1]*4 + H_c(x) \quad (32)$$

The functions $H_c(x)$ and $V_c(y)$ are given by:

$$H_c(x) = \text{ceiling}[\text{modulo}(x/SFL_c)/SSL_c] \quad (33)$$

$$V_c(y) = \text{ceiling}[\text{modulo}(y/SFL_c)/SSL_c] \quad (34)$$

The nodes to which a particular control time slot 54 is allocated play the role of the sender and control the dialogue between them and the intended receivers. Two nodes that are allocated the same control time slot 54 are referred to as simultaneous senders. Two destination nodes that have to respond to a query control packet sent by the sender during the same response control sub-slot are referred to as simultaneous receivers. In order to prevent the response control packets of simultaneous receivers from colliding at common neighbors, the minimum distance between simultaneous receivers must be equal to 2R (where R is the maximum transmission range), so that their respective one-hop neighborhoods do not overlap. In order to guarantee that simultaneous receivers are separated by a minimum distance equal to 2R, the minimum distance between simultaneous senders must be equal to 4R. Therefore, the minimum distance between simultaneous space slots ($SSD_c$) is set to 4R.

Consequently, $SSL_c$ and $SFL_c$ are given by:

$$SFL_c = SSL_c + 4R \quad (35)$$

$$SFL_c = 4*SSL_c \quad (36)$$

By combining equations 35 and 36, we obtain the following:

$$SSL_c + 4R = 4*SSL_c \rightarrow 4R = 3*SSL_c \rightarrow SSL_c = 4*R/3 \quad (37)$$

Therefore, by substituting for $SSL_c$ in equation 36, $SFL_c$ is given by:

$$SFL_c = 16*R/3 \quad (38)$$

Therefore, equations 33 and 34 can be rewritten as follows:

$$H_c(x) = \text{ceiling}[3*\text{modulo}(3x/16R)/4R] \quad (39)$$

$$V_c(y) = \text{ceiling}[3*\text{modulo}(3y/16R)/4R] \quad (40)$$

Therefore, a given node in the network with current space coordinates ($x_i$, $y_i$), allocates itself the control time slots 54 belonging to control time slot set $L_c[S(x_i, y_i)]$. Time slot allocation conflicts occurring when multiple nodes are located within the same space slot are resolved by the process described in the 'Time slot allocation conflict resolution' sub-section of this specification.

Node State Variable Definitions

We define, for each node, the following variables:

X(s, f, i) ≡ maximum power level that node (i) can use for a transmission on (s, f) without interfering with the reception assignments of any of its neighbors. When X(s, f, i) is equal to zero, allocation (s, f) is unavailable for future transmission assignments; this could happen if node (i) has already been assigned to transmit on (s, f), or a neighbor very close to node (i) has been assigned to receive on (s, f). X(s, f, i) ranges from 0 to Maximum_Power_Level and Initial Value [X(s, f, i)]=Maximum Power Level.

X(s, f, i, j)≡Node j's perception of X(s, f, i).

R(s, f, i) is a Boolean flag indicating the ability of node (i) to receive on (s, f). R(s, f, i) is set to 1 if node (i) is able to receive on (s, f), and set to 0 otherwise. Initial Value [R(s, f, i)]=1

N(i, j)=minimum power level at which nodes i and j are within transmission range of each other. N(i, j)=N(j, i)

Transmission Assignment Set (i)=TAS(i)={[(s, f), X(s, f, i)]|X(s, f, i)>0 for each (s, f)}. TAS(i) is the set of [(s, f), Power] pairs that are advertised by node i as available for transmission assignments.

Receive Assignment Set (i)=RAS(i)={(s, f)|R(s, f, i)>0 for each (s, f)}. RAS(i) is the set of (s, f) pairs that are available to node i for reception assignments.

Communication Assignment Event

A communication assignment event is uniquely defined by the following values:

s=time slot during which the transmission will occur f=channel that will be used for the transmission. A channel can be a frequency channel of an FDMA system, or a code channel of a CDMA system.

Transmitter=Node ID of node assigned to transmit on (s, f).

Receiver=Node ID of node assigned to receive on (s, f).

Power=Power level that will be used by the transmitter for its transmission on (s, f). This is assigned by the receiver, based on the stored value of N(receiver, transmitter) and the perceived link quality between the transmitter and the receiver.

We define the procedure ASSIGNMENT, which is the response of a node triggered by the reception of a communication assignment event for pair (s, f), such that the following constraints are satisfied:

Constraint a: A node cannot transmit and receive during the same time slot.

Constraint b: The power used by a node for transmitting on a (s, f) pair has to be such that the transmitting node will not interfere with any of its neighbors that are receiving on (s, f).

Constraint c: A node cannot receive on a (s, f) pair on which a neighbor is transmitting at a power level that will interfere with the node's ability to receive.

Procedure ASSIGNMENT takes as inputs the following parameters, in the following order:

1) s=time slot during which the transmission will occur.
2) f=channel that will be used for the transmission. A channel can be a frequency or a code.
3) current node=Node ID of node processing the communication assignment event.
4) advertising node=Node ID of node announcing the communication assignment event.
5) transmitter=Node ID of node assigned to transmit on (s, f).
6) receiver=Node ID of node assigned to receive on (s, f).
7) power=Power level that will be used by the transmitter for its transmission on (s, f).

Therefore, the first input represents the time slot during which the transmission is scheduled for, the second input represents the channel on which the transmission will take place, the third input represents the node ID of the node processing the communication assignment event, the fourth input represents the node ID of the node advertising the communication assignment event, the fifth input represents the node ID of the node that will transmit on (s, f), the sixth input represents the node ID of the node that will receive on (s, f), and the seventh input represents the power level that will be used by the transmitter for its transmission on (s, f). Procedure ASSIGNMENT is given by the following pseudo-code:

Procedure Assignment (s, f, current node, advertising node, transmitter, receiver, power level)

IF (the advertising node of the communication event is the receiver) THEN
    IF (the current node is the transmitter or the receiver) THEN
        Set X(s, f, current node) to 0, for all channels (satisfy constraint a)
        Set R(s, f, current node) to 0, for all channels (satisfy constraint a)
    ELSE
        Set X(s, f, current node) to [N(current node, receiver (i))−1],
        [N(current node, receiver(i))−1] is the minimum power level at which the current node can transmit without causing any interference at the receiver (satisfy constraint b)

ELSE
IF (the advertising node of the communication event is the transmitter) THEN
    IF (the current node is not the transmitter or the receiver) THEN
        Set X(s, f, transmitter, current node) to 0, for all channels (satisfy constraint a).
        IF (the power level that will be used by the transmitter is equal to or greater than the minimum power level at which the current node and the transmitter can interfere with each other) THEN
            Set R(s, f, current node) to 0 (satisfy constraint c).

Communicating Slot and Channel Pair Data Between a Source and a Set of Receivers Referring to FIG. 5, we give the sequence of events that occur during the time sub-slots of a particular control time slot 54.

Control sub-slot[1] (56): The transmitter sends a query control packet containing a list of intended receivers and a selected sub-set of its Transmission Assignment Set.

FOR i:=1 TO 2

Control sub-slot[2i]: Upon reception of the query control packet, receiver(i) executes the following steps:
    a) Searches its Receive Assignment Set for an $(s_a, f_a)$ pair that satisfies: $\{[R(s_a, f_a, \text{receiver}(i))=1] \text{ AND } [X(s_a, f_a, i, j) \geq N(\text{receiver}(i), \text{transmitter})]\}$;
    b) Executes procedure ASSIGNMENT[$s_a$, $f_a$, receiver(i), receiver(i), transmitter, receiver(i), X($s_a$, $f_a$, i, j)]; and,
    c) Sends a response control packet advertising the assigned $(s_a, f_a)$ pair.

Upon reception of the response packet, each neighbor(j) of receiver(i) executes procedure ASSIGNMENT[$s_a$, $f_a$, neighbors(j), receiver(i), transmitter, receiver(i), X($s_a$, $f_a$, i, j)]

Control sub-slot[2i+1]: Upon reception of the response packet, the transmitter sends a confirmation packet advertising the assigned $(s_a, f_a)$ pair. Upon reception of the confirmation packet, each neighbor(k) of the transmitter executes procedure ASSIGNMENT[$s_a$, $f_a$, neighbor(k), transmitter, transmitter, receiver(i), X($s_a$, $f_a$, i, j)].

One skilled in the art can appreciate that the method operates by using a set of programmable instructions executed by one or more processors in the network of transceiver nodes to perform the functions of the method as described in the specification.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A method for allocating a set of time slots belonging to a common time division multiple access (TDMA) channel to a network of transceiver nodes, the method comprising the steps of:
    dividing said set of time slots into a plurality of time slot sub-sets;
    defining for each transceiver node a common function that assigns one time slot sub-set of said plurality of time slot sub-sets to each point in space, wherein said each point in space is identified by a unique set of space coordinates; and
    performing the following steps for each one of said transceiver nodes:
        periodically identifying a set of space coordinates; and
        allocating to said each one of said transceiver nodes time slots belonging to the time slot sub-set assigned by said common function to the point in space identified by the periodically identified set of space coordinates; and
    resolving time slot allocation conflicts occurring when at least two transceiver nodes of said network of transceiver nodes are allocated time slots belonging to an identical time slot sub-set and the distance between said at least two transceiver nodes is less than a predetermined distance threshold, wherein said resolving step comprises the step of allocating to each one of said at least two transceiver nodes time slots belonging to a different time slot sub-set of said identical time slot sub-set.

2. The method of claim 1, wherein the periodically identified set of space coordinates corresponds to said each one of said transceiver nodes current set of space coordinates.

3. The method of claim 1, further comprising the step of using said set of time slots belonging to said common TDMA channel for managing communication channel resources between a plurality of nodes of said network of transceiver nodes.

4. The method of claim 3, wherein each node of said plurality of nodes communicates on multiple channels on a time multiplex basis.

5. The method of claim 4, further comprising the steps of:
    dividing each time slot of said set of time slots belonging to said common TDMA channel into a plurality of time sub-slots; and
    designating one time sub-slot of said plurality of time sub-slots as a query time sub-slot;
    wherein each source node of said plurality of nodes desiring to send data to a destination sub-set of said each source node's respective set of neighboring nodes transmits a query packet including the identifier of each node of said destination sub-set of said respective set of neighboring nodes during the query time sub-slot of an allocated time slot of said set of time slots belonging to said common TDMA channel.

6. The method of claim 5, further comprising the steps of:
    storing for each communicating node of said plurality of nodes:
        a transmit set of time slot and channel pairs which can be used by said each communicating node to transmit data to said each communicating node's said respective set of neighboring nodes; and
        a receive set of time slot and channel pairs which can be used by said each communicating node to receive data from each communicating node's said respective set of neighboring nodes; and
    communicating a portion of the stored time slot and channel pair data between said each source node and said destination sub-set during the subsequent time sub-slots of said allocated time slot.

7. The method of claim 6, wherein said query packet further includes a selected sub-set of said transmit set of time slot and channel pairs stored for said each source node.

8. The method of claim 7, wherein said step of communicating said portion of the stored time slot and channel pair data is performed by sequentially repeating for each destination node of said destination sub-set of said each source node's said respective set of neighboring nodes the following steps:
    identifying by said each destination node an assignment set of time slot and channel pairs belonging to both the selected sub-set of said transmit set of time slot and channel pairs included in said query control packet and the receive set of time slot and channel pairs stored for said each destination node;
    sending by said each destination node a response packet including said assignment set of time slot and channel pairs on which said each destination node desires to receive data from said each source node;
    receiving by said each source node said response packet including said assignment set of dine slot and channel pairs; and
    sending by said each source node a confirmation packet including said assignment set of time slot and channel pairs which said each source node uses to transmit data to said each destination node.

9. The method of claim 8, wherein:
    each neighboring node of said each destination node receiving said response packet identifies in the transmit set of time slot and channel pairs stored for said each neighboring node of said each destination node the time slot and channel pairs belonging to said assignment set of time slot and channel pairs; and
    each neighboring node of said each source node receiving said confirmation packet identifies in the receive set of time slot and channel pairs stored for said each neighboring node of said each source node the time slot and channel pairs belonging to said assignment set of time slot and channel pairs.

10. A system for allocating a set of time slots belonging to a common time division multiple access (TDMA) channel to a network of transceiver nodes, said system comprising:
    means for dividing said set of time slots into a plurality of time slot sub-sets;
    means for defining for each transceiver node a common function that assigns one time slot sub-set of said plurality of time slot sub-sets to each point in space, wherein said each point to space is identified by a unique set of space coordinates;
    means for performing the following steps for each one of said transceiver nodes:
        periodically identifying a set of space coordinates; and allocating to said each one of said transceiver nodes time slots belonging to the time slot sub-set assigned by said common function to the point in space identified by the periodically identified set of space coordinates; and means for resolving time slot allocation conflicts occurring when at least two transceiver nodes are allocated time slots belonging to an identical time slot sub-set and the distance between said at least two transceiver nodes is less than a predetermined distance threshold, wherein said resolving means comprises means for allocating to each one of said at least two transceiver nodes time slots belonging to a different time slot sub-set of said identical time slot sub-set.

11. The system of claim 10, wherein the periodically identified set of space coordinates corresponds to said each one of said transceiver nodes current set of space coordinates.

* * * * *